Jan. 6, 1970 R. F. J. McCARTHY ET AL 3,487,879
BLADES, SUITABLE FOR PROPELLERS, COMPRESSORS, FANS AND THE LIKE
Filed July 22, 1968
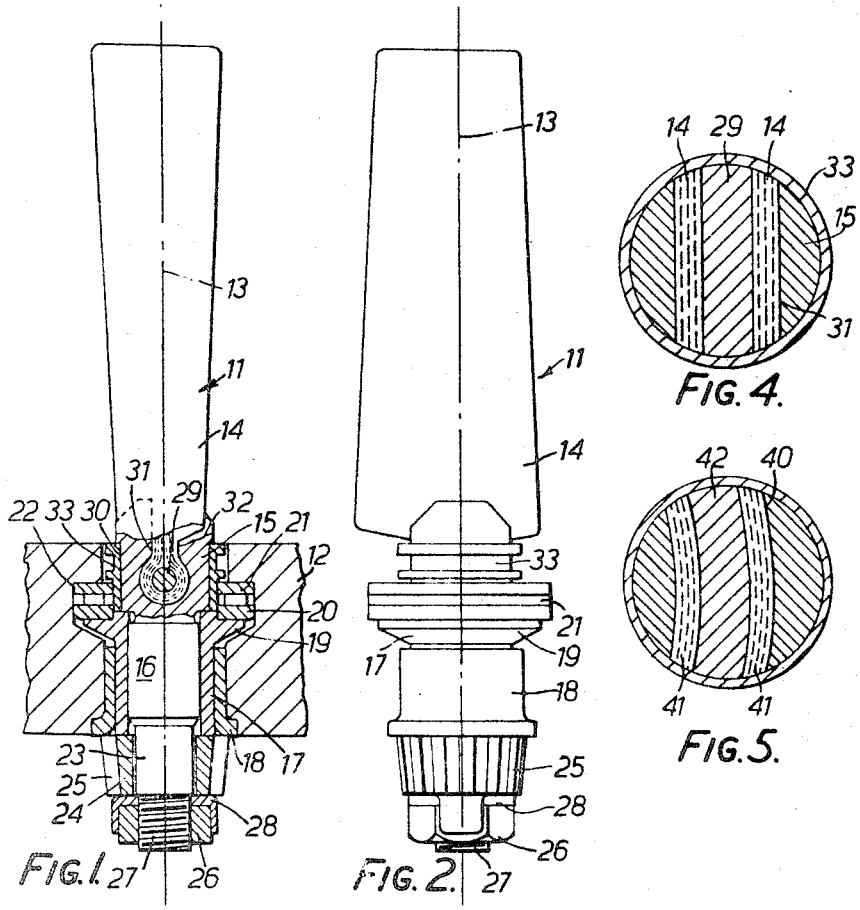
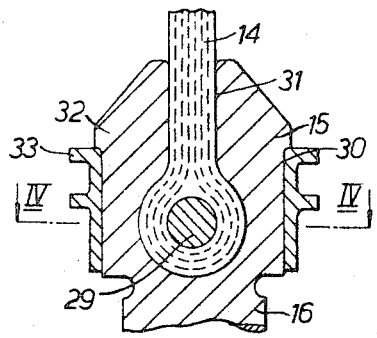
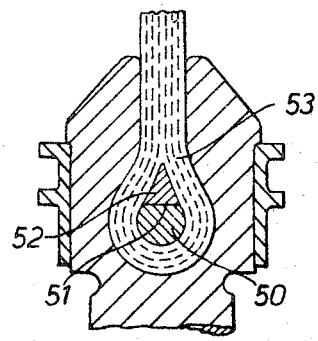
INVENTORS
ROY FRED JOHN McCARTHY
WILLIAM GERALD WILLIAMS
BY
ATTORNEYS United States Patent Office 3,487,879
Patented Jan. 6, 1970

3,487,879
BLADES, SUITABLE FOR PROPELLERS, COMPRESSORS, FANS AND THE LIKE
Roy F. J. McCarthy, Charlton Kings, and William G. Williams, Cheltenham, England, assignors to Dowty Rotol Limited, Gloucester, England, a British company
Filed July 22, 1968, Ser. No. 746,474
Claims priority, application Great Britain, Aug. 2, 1967, 35,437/67; Feb. 5, 1968, 5,680/68
Int. Cl. B64c 11/06, 11/26; F04d 29/38
U.S. Cl. 416—220      13 Claims

ABSTRACT OF THE DISCLOSURE

A blade, suitable for propellers, compressors, fans and the like, has a working portion of fibrous-reinforced plastics material and a root portion having a slot so shaped as to receive an enlargement formed at the base of the working portion by there looping the fibres of the blade around a pin. A retaining band is fitted around the root portion in the vicinity of the slot to retain the pin and thus the working portion and root portion together in unit assembly.

FIELD OF THE INVENTION

This invention relates to blades, suitable for propellers, compressors, fans and the like.

SUMMARY OF THE INVENTION

According to this invention a blade suitable for propellers, compressors, fans and the like, comprises a working portion of fibrous-reinforced plastics material, and a root portion arranged for fitment to a hub, disc, drum or the like, the fibres of said working portion being looped around a pin or the like to form an enlargement at the base of the working portion, and said base fitting in a slot which is formed in the root portion and which is suitably shaped to accommodate said enlargement and thus to retain the blade working portion in the radial sense, a retaining band or sleeve being fitted around the root portion in the vicinity of the slot, thereby to retain the pin, and thus the working portion and root portion together in unit assembly.

The root portion of the blade may be so mountable in the hub, drum, disc or the like, as to afford the blade variability in its pitch under the control of pitch-changing mechanism.

A shoulder may be provided upon the external surface of the root portion to form a stop in the radially-outward sense for the retaining band or sleeve.

Preferably, the root portion is of circular cross-section, said slot passing diametrically through it.

The fibrous reinforcement of the working portion of the blade may be glass-fibre, the glass-fibre structure comprising layers of uni-directional and of bi-directional form, while the plastics material may be an epoxy resin, the assembly preferably being subjected to a curing process following laying-up.

The pin or the like may be of circular cross-section, and of steel, or alternatively it may be basically of fibrous material, for example, glass-fibre.

Where the pin or the like is of glass-fibre, it may be made from layers of glass-fibre cloth which are pre-impregnated with an epoxy resin and preferably cured at the same time as the blade structure is cured.

Where the pin or the like is of part circular cross-section, a wedge-shaped member may also be provided immediately adjacent the pin and on that side thereof closer to the blade working portion, thus to provide a rigid filler within the looped fibres of the blade working portion.

The pin or the like may be either straight in shape, or, alternatively, where it is required that the pin should follow the camber of the blade, the pin is suitably curved, as is the slot in the root portion.

BRIEF DESCRIPTION OF THE DRAWINGS

Of the six accompanying drawings:

FIGURE 1 is a cross-section of a blade assembly in accordance with the first embodiment, FIGURE 2 is an external view of the blade assembly shown in FIGURE 1, FIGURE 3 is an enlarged view of a part of FIGURE 1, FIGURE 4 is a cross-section taken along the line IV—IV on FIGURE 1, FIGURE 5 is a cross-section similar to that of FIGURE 4, but showing a modification in accordance with the second embodiment, and, FIGURE 6 is a view similar to FIGURE 3 but showing a modification in accordance with the third embodiment.

DESCRIPTION OF THE PREFERRED EMBODIMENTS

Referring to FIGURES 1 to 4 of the drawings, a blade 11 suitable for mounting in a compressor rotor drum, part of which is shown at 12 in FIGURE 1, and so constructed as to be mounted for pivotal movement in the drum about the longitudinal axis 13 of the blade, comprises a working portion 14, and a root portion 15 of circular cross-section.

The root portion 15 is provided with a part 16 of reduced diameter by which the blade structure is mounted in a sleeve 17, which is itself mounted in a bush 18 in the drum 12. The sleeve 17 has a flange 19 which bears against the lower race 20 of a roller bearing 21 housed in a recess 22 in the drum. The root portion is further reduced in diameter at 23 and is splined at 24. An internally-splined bevel gear 25 fits upon the portion 23 and is retained axially by a nut 26 secured to the screw-threaded end portion 27 of the root portion. A locking washer 28 is provided for the nut.

When the blade is fitted to the drum this bevel gear 25, which is of shallow angle, is in mesh with a further bevel gear (not shown), angularly-adjustable about the rotational axis of the drum to drive the gears of all of the blades of the compressor for pitch-changing movement in unison.

The driving bevel gear is operated by hydraulic, electrical or other means.

The working portion 14 of the blade 11 comprises in this embodiment twenty-six layers of uni-directional glass-fibre cloth pre-impregnated with an epoxy resin, with the main fibres running span-wise of the blade and set-over alternately at five degrees to the longitudinal axis. One final layer of bi-directional cloth is laid up on top of the twenty-six layers to form the surface layer on each face, with the fibres thereof running at 45 degrees to the longitudinal axis. All of these layers are looped around a steel pin 29 of circular cross-section to form an enlargement at the base of the working portion 14, and the complete lay-up is clamped in a suitable mould and the whole assembly cured at 170 degrees C. for three hours.

The mould is designed to the required finished shape of the blade with the desired amount of twist and camber.

During the curing process, the glass-fibre layers of the laminate are simply laid in the mould and are not subjected to any pre-tensioning from root to tip.

The root portion 15 is of titanium alloy and, as more clearly shown in FIGURES 1 and 3, above the part 16 it is enlarged in diameter at 30 and provided with a "keyhole" slot 31, diametrically disposed therein, into which the blade working portion 14, complete with the pin 29 can be slid at the fibrous enlargement around the pin.

In this embodiment the blade pin 29 which is straight, is diametrically disposed with respect to the root portion 15.

As shown in FIGURES 1 and 2, the upper part of the root portion 15 is provided with a shoulder 32 which forms a stop in the radially-outward sense for a flanged steel sleeve 33 which fits with slight interference over the part 30 of larger diameter of the root portion.

The working portion 14 is slid into the slot 31 together with an epoxy adhesive, and once the sleeve 33 has been fitted, the adhesive is cured at 100 degrees C. for 20 minutes.

The sleeve 33 serves to retain the pin 29 in position in the blade structure and thus serves to hold the working portion 14 of the blade and the root portion 15 together in unit assembly.

The shoulder 32 prevents the sleeve 33 from moving outwardly under centrifugal force during operation.

Thus, by this construction, a blade is provided in which the working portion can be of reinforced plastics material positively mechanically locked to the root portion, while the root portion, conveniently, can be shaped to facilitate mounting of the blade in the associated drum in such manner as to permit its pivotal movement for pitch-change.

With reference now to FIGURE 5 of the drawings, there is shown a modification in which the "key-hole" slot 40 is curved, the radius of curvature being such as to conform with the camber of the associated blade working portion 41. Likewise, the pin 42 is also curved and is of steel.

Referring now to FIGURE 6 of the drawings, there is shown a construction similar to that of the first embodiment, but instead of providing a pin of circular cross-section around which the layers of the working portion are looped, the pin 50 is provided with a flat 51 in the position shown against which a wedge-shaped member 52 abuts, this member acting as a filler between the blade layers 53 adjacent the pin. Thus a filling of "tear-drop" cross-sectional shape is formed by the pin 50 and member 52 which affords improved rigidity at the blade laminate/root portion articulation.

In a fourth embodiment of the invention, which is not illustrated, the construction and process of manufacture of a blade, suitable for pivotal mounting in a compressor rotor drum, are very similar to those of the first-described embodiment, the only difference being in the material from which the straight pin is made.

In this embodiment the pin is instead made by producing a sheet which comprises twenty-four layers of glass-fibre cloth each .008 inch thick and which are pre-impregnated with an epoxy resin. The assembly of layers is compacted into a unitary sheet by applying a pressure of 20 lbs./square inch thereto. This sheet is approximately 3/16 inch thick. The pin is cut from this sheet and is initially of substantially square cross-section.

In the laying-up procedure of the blade portion, which is very similar to the laying-up procedure described with reference to FIGURES 1 to 4, the pre-impregnated glass-fibre pin is sufficiently strong in its uncured state for all of the layers of the blade itself to be looped around it.

Again the impregnated glass-fibre layers of the laminate are simply laid in the mould and are not subjected to any pre-tensioning from root to tip.

After such laying-up, the assembly complete with the glass-fibre pin, is cured at 170 degrees C. for three hours. During this curing process the pin is transformed from its initial substantially square cross-sectional shape into "tear-drop" cross-sectional shape due to the compressing effect of the mould upon the loops of the blade layers and upon the pin as positioned within them.

Following curing, the procedure of fitment of the blade into its slot in the root portion is as described with reference to FIGURES 1 to 4.

Although in the above-described embodiments the pins or fillings are either of circular or of "tear-drop" cross-section, in other embodiments the pins may be of other suitably-shaped cross-section.

Although in the above-described fourth embodiment the pin or the like is initially of substantially square cross-section, other pins of different cross-sectional shape, but again of glass-fibre material, or alternatively other fibrous material, may instead be used. Such pins may be formed from a multiplicity of strands or rovings simply laid up together in a desired cross-sectional shape and pre-impregnated with resin, as for example by drawing them through the stem of a suitably-shaped funnel with the mouth portion of the funnel containing the resin.

Further, the construction of the fibrous pins is in no way limited to being straight, but like the second embodiment may be curved, the radius of curvature being again such as to conform with the camber of the associated blade working portion and with the "key-hole" slot of the root portion into which the blade portion is insertable.

The invention is in no way limited to a root portion of circular cross-section, or to a sleeve or band of circular cross-section fitting thereon, as in other embodiments other cross-sectional shapes of root portion and of band or sleeve are with advantage provided. The material of these components is not limited to titanium alloy and steel respectively, as in other embodiments alternative materials, metallic or non-metallic, of a suitable nature may instead be used.

Also, the invention is in no way limited to blades of variable-pitch type, as in other embodiments it is applied to blades of fixed-pitch or to blades of pre-adjustable pitch.

Although in the above-described embodiments the blades are intended for fitment to the drum of a compressor, in other embodiments the blades may be suitable for propellers, fans or the like and in this case mountable in hubs or discs respectively.

Again, the invention is in no way limited to epoxy resin-impregnated glass-fibre material or to the precise form of laminate described, as in other embodiments other suitable reinforcing materials for example, carbon filaments, and other suitable plastics materials may with advantage be used, either alternatively to glass-fibre material, or in combination therewith.

Yet again, although reference has hereinbefore been made to the use of an epoxy resin for impregnation of the glass-fibre prior to laying-up, in other embodiments other suitable alternative resins may with advantage be employed.

We claim:

1. A blade suitable for propellers, compressors, fans and the like, comprising a working portion of fibrous-reinforced plastics material, and a root portion arranged for fitment to a hub, disc, drum and the like, wherein the improvement resides in the fact that the fibres of said working portion are looped around a pin-like element to form an enlargement at the base of the working portion, and said root portion includes slot-defining means formed therewith into which said base fits, said slot-defining means being suitably shaped as to accommodate said enlargement and to retain the blade working portion in the radial sense, a retaining element being fitted around the root portion in the vicinity of the slot-defining means, thereby to retain the pin and thus the working portion and root portion together in unit assembly.

2. A blade as claimed in claim 1, wherein the root portion thereof is adapted to lie mounted in a hub, drum, disc and the like, and further comprising means on said root portion adapted as to afford the blade variability in its pitch under the control of pitch-changing mechanism.

3. A blade as claimed in claim 1, wherein a shoulder is provided upon the external surface of the root portion to form a stop in the radially-outward sense for the retaining element.

4. A blade as claimed in claim 1, wherein the root portion is of circular cross-section, said slot-defining means being arranged diametrically across it.

5. A blade as claimed in claim 1, wherein the fibrous reinforcement of said working portion is glass-fibre, the glass-fibre structure comprising layers of uni-directional and of bi-directional form.

6. A blade as claimed in claim 1, wherein the plastics material is an epoxy resin, the blade assembly being subjected to a curing process following laying-up.

7. A blade as claimed in claim 1, wherein the pin-like element is of circular cross-section.

8. A blade as claimed in claim 1, wherein the pin-like element is of steel.

9. A blade as claimed in claim 1, wherein the pin-like element is basically of fibrous material.

10. A blade as claimed in claim 9, wherein the pin-like element is made from layers of glass-fibre cloth which are pre-impregnated with an epoxy resin cured at the same time as the blade strucuture is cured.

11. A blade as claimed in claim 1, wherein the pin-like element is of part-circular cross -section and a wedge-shaped member is provided immediately adjacent the pin and on that side thereof closer to the blade working portion, thus to provide a rigid filler within the looped fibres of the blade working portion.

12. A blade as claimed in claim 1, wherein the pin-like element is straight in shape.

13. A blade as claimed in claim 1, wherein where it is required that the pin-like element should follow the camber of the blade, that element is suitablly curved, as is the slot-defining means in said root portion.

References Cited

UNITED STATES PATENTS

| | | | |
|---|---|---|---|
| 2,868,439 | 1/1959 | Hampshire et al. | 253—77 |
| 2,868,441 | 1/1959 | Reutt | 230—133 |
| 2,929,755 | 3/1960 | Porter | 253—77 |
| 2,934,317 | 4/1960 | Warnken | 230—133 |
| 3,132,841 | 5/1964 | Wilder | 253—77 |

FOREIGN PATENTS

| | | |
|---|---|---|
| 775,816 | 5/1957 | Great Britain. |
| 787,500 | 12/1957 | Great Britain. |

HENRY F. RADUAZO, Primary Examiner

U.S. Cl. X.R.

416—230, 241